Sept. 11, 1945.  S. C. CARTER  2,384,441
VEHICLE
Filed Feb. 7, 1944  2 Sheets-Sheet 1

Inventor
Samuel C. Carter
by [signature]
Attorney

Sept. 11, 1945.  S. C. CARTER  2,384,441
VEHICLE
Filed Feb. 7, 1944   2 Sheets-Sheet 2

Inventor
Samuel C. Carter

Patented Sept. 11, 1945

2,384,441

UNITED STATES PATENT OFFICE 2,384,441

VEHICLE

Samuel C. Carter, Los Angeles, Calif.

Application February 7, 1944, Serial No. 521,371

18 Claims. (Cl. 180—3)

This invention has to do with a vehicle and is more particularly concerned with a vehicle to operate through snow. A general object of the invention is to provide a vehicle of the character mentioned which, instead of attempting to dislodge or remove snow from its path utilizes the snow to form a bed or track to carry the vehicle.

Ordinary wheeled vehicles such as automobiles or trucks can successfully operate through snow providing it is not too deep, and this is also true of tractors having track-laying means of propulsion. However, when such vehicles encounter deep snow they are quickly packed in the snow and become inoperative. Various attempts have been made to provide mechanisms on vehicles to aid them in traveling through snow, such mechanisms being characterized by means designed to push or throw the snow from the path of the vehicle, this being the characteristic principle employed in so-called snow plows which are well known in countries subject to snow.

It is an object of my present invention to provide a vehicle which will readily travel through thick or deep snow and which does not depend on scraping or throwing the snow from the path of the vehicle, but rather operates to pack the snow down to form a bed or road over which the vehicle can readily pass. It is well known that snow, when packed sufficiently will support a substantial weight, and it is by packing the snow that I establish a bed which will support the vehicle.

Another object of my invention is to provide a vehicle of the character referred to which is extremely simple in construction and operation, making it inexpensive of manufacture and suitable for general use.

Another object of my invention is to provide novel features of control in a vehicle of the character mentioned so that the vehicle is flexible in use and can be operated advantageously under various conditions. My invention provides a vehicle having, in combination, supporting wheels, supporting skids or runners, and snow packers, and the invention provides means for adjustment of these various parts relative to each other so that the vehicle can be operated in the most advantageous manner.

Figure 1:
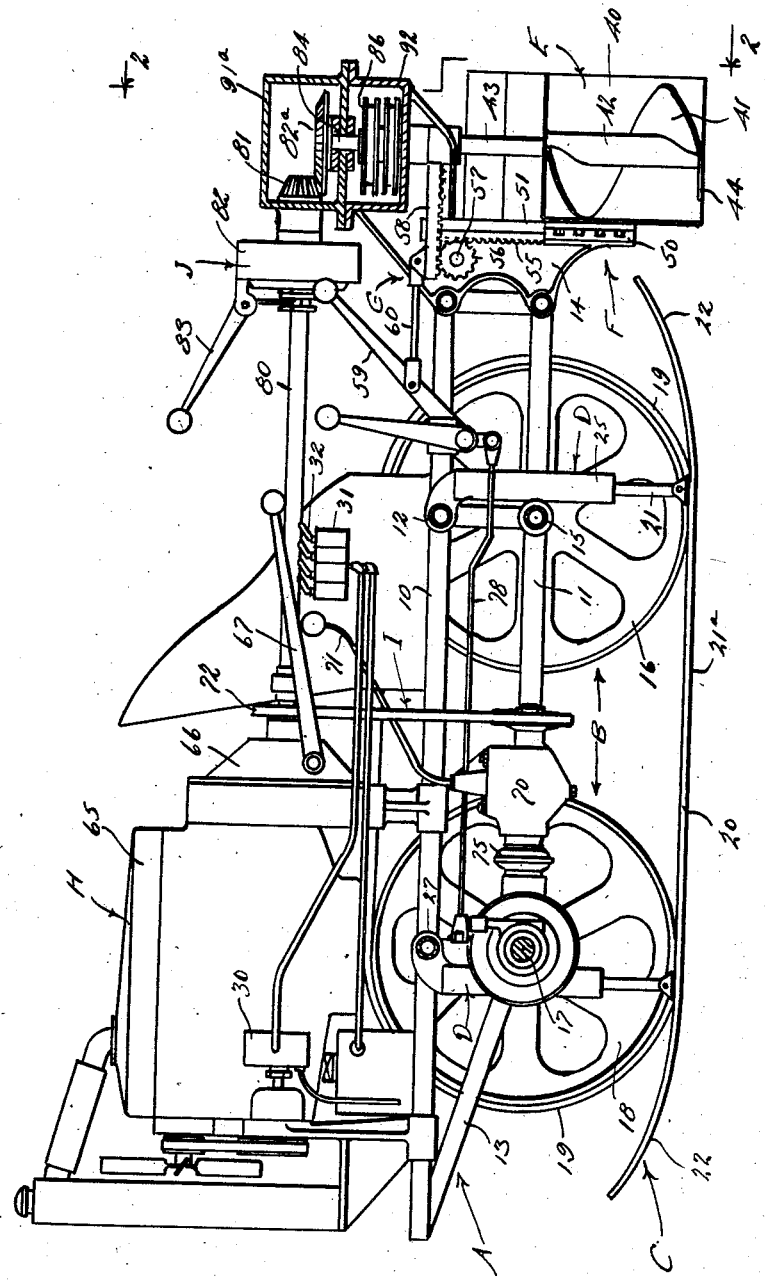
Figure 2:
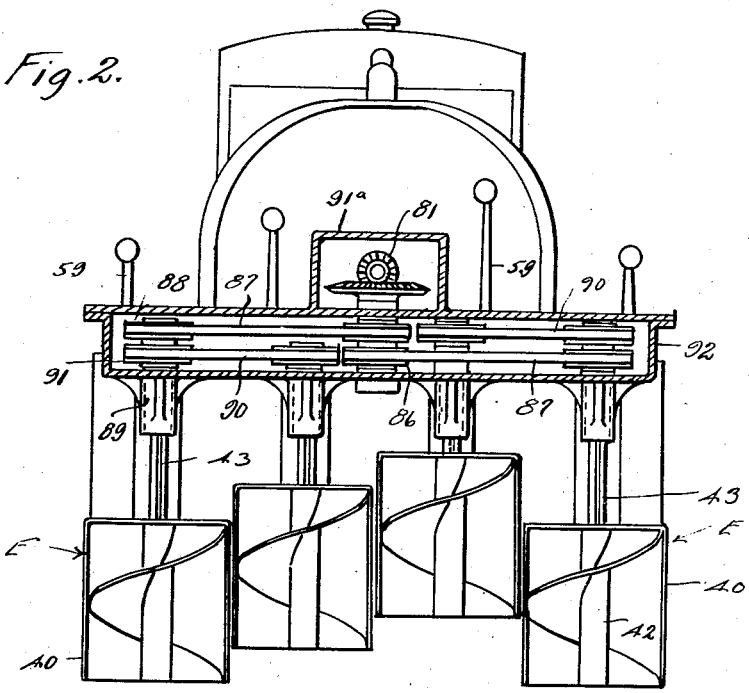
Figure 3:
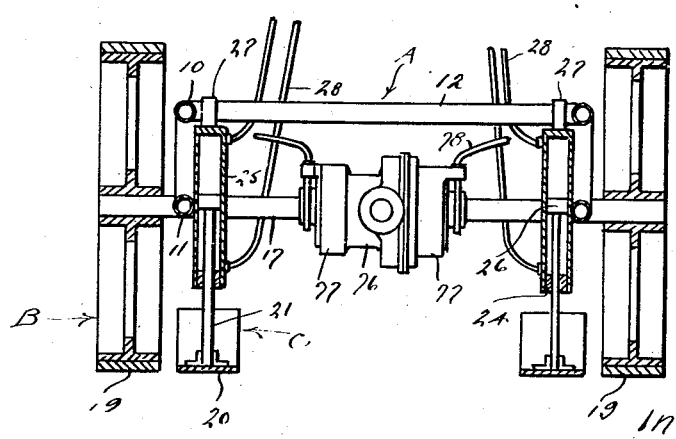

The various objects and features of my invention will be fully understood from the following detailed description of a typical preferred form and application of the invention, throughout which description reference is made to the accompanying drawings, in which:

Fig. 1 is a longitudinal sectional view of the vehicle provided by my invention, showing the general arrangement and relationship of the various parts. Fig. 2 is a front view of the vehicle being a view taken substantially as indicated by line 2—2 on Fig. 1, and Fig. 3 is a transverse sectional view taken to show the wheel support and skid support with its adjusting means, both in section.

The vehicle of the present invention involves, generally, a frame A which forms or serves as a carrier for the various other elements of the mechanism, a wheel support B in connection with the frame A, a skid support C provided in connection with the frame, means D for operating the skid support vertically relative to the wheel support, snow packers E arranged at the forward end of the vehicle, guide means F supporting the packers E for vertical movement relative to the frame, adjusting means G for operating the packers E vertically, a prime mover or motor H for supplying power for the wheels, the means D and the packers E, a drive means I for operating the wheels from the motor H, drive means J for operating the packers E from the motor H, and various other parts the details and functions of which will appear in the course of the following description.

The frame A which is the general carrier or support for the other parts of the machine, is designed and proportioned to effectively support the various elements, and, in practice, may vary widely both in form and construction. It will be apparent that the frame of the vehicle can follow, generally, the construction employed in motor vehicles and can, in any particular case, be made relatively light and strong and yet effectively carry the parts required to be supported thereby.

In the case illustrated I have shown a very simple frame construction involving upper side members 10 which extend longitudinally of the vehicle, lower side members 11 which extend longitudinally of the vehicle and are spaced a suitable distance below the members 10, transverse tie members 12 which extend between the longitudinal frame parts, diagonal braces 13 at the rear end portion of the frame connecting the rear ends of the upper and lower members 10 and 11, and a vertically disposed plate 14 at the forward end of the members 10 and 11. In the drawings the various parts of the frame, except the plate 14, are formed of tubular stock as this form of frame member is light, strong and has general characteristics suitable for this type of construction. It is to be understood, of course, that in practice variously shaped members may be employed in the frame and that the frame construction can be built up in a manner quite different from that described.

The wheel support B provided by the present invention involves a front axle 15 supported at the forward part of the vehicle by the lower side frame members 11, a pair of front wheels 16 on the axle 15, a rear axle 17 supported at the rear portion of the vehicle by the frame members 11 and a pair of rear wheels 18. In some cases I can employ a wheel support involving the elements just described, in which case the rims or treads of the wheels are made wide and provided with suitable gripping surfaces to effectively act on the packed snow. In the particular form of the invention illustrated, however, I have shown the wheel support equipped with treads in the form of endless belts 19 carried on and between the front and rear wheels which construction gives a more effective bearing support on the packed snow. When employing an endless belt or belt tread in connection with the wheels it is, of course, necessary to arrange the front and rear wheels in alignment so that the belts operate over them without becoming displaced.

The skid support C supplements the wheel support B and may, in practice, include a pair of longitudinally disposed skids 20 supported on legs 21 depending from adjusting means D. The skids 20 in the case illustrated are located immediately inside of the wheels of the means B and each skid has a long body portion extending from a point adjacent the front wheels to a point adjacent the rear wheels and has a flat smooth bottom or skid face 21a designed to operate over the packed snow. The end portions 22 of the skids are upturned, as clearly shown in Fig. 1, in the manner common to skids designed to operate over snow.

The adjusting means D provided to operate the skid means C vertically relative to the wheel support B may, in practice, be any suitable mechanism that will operate to properly position the skids relative to the wheel support. In the form of the invention illustrated I provide two supporting legs 21 in connection with each skid 20, one attached to the skid near its forward end and the other attached to the skid near its rear end. I provide an individual cylinder and piston mechanism in connection with each leg 21 to move it vertically and to hold it in any desired position of vertical adjustment.

Each of the mechanisms just mentioned includes a cylinder 25, a piston 26 slidably carried in the cylinder 25 and attached to the upper end of the leg 21 which enters the lower end of the cylinder through a suitable stuffing box 24. Each cylinder 25 is supported in a vertical position from the frame A through suitable mounting brackets 27. The pistons 26 are adapted to be operated vertically in the cylinders 25 and are held in the desired positions in the cylinders 25 by a suitable medium supplied to the ends of the cylinder through control lines 28.

In practice I may operate the means D by oil under pressure. The oil may be supplied under pressure by a suitable pump 30 driven by the engine H. In the arrangement illustrated oil under pressure is supplied by the pump H to a control mechanism 31 located convenient to the operator of the vehicle, which control mechanism includes a plurality of individual valves, each having a control member 32 and each controlling the supply and exhaust of oil under pressure to one of the cylinder and piston mechanisms of the means D.

It is to be understood that my invention is in no way concerned with the details of the hydraulic system employed for controlling the cylinder and piston mechanisms but is concerned merely with the general arrangement.

Through the construction above described the operator can, by operating the controls 32, raise and lower the skids at either end or at both ends, to vary the vertical position relative to the wheel support B or to vary the angular position relative to the wheel support, for example, the skids can be adjusted so that they are at different heights relative to the wheels, that is, so one is higher than the other, or they can be adjusted so that either one or both has its forward end somewhat higher than its rear end, etc.

The packers E provided by my invention are located at the forward end of the vehicle and are such as to be advanced into a body of snow, and are operable to receive snow and move it downwardly and to pack it so that the snow forms a body or bed that will support the vehicle. In practice I may use one large snow packer E or I may use a plurality of smaller snow packers arranged in side by side relation, as I have shown throughout the drawings. The latter arrangement, that is, the provision of a plurality of packers, is preferred in that this enables each packer to be smaller and allows for flexibility of operation, which will be apparent from the following description.

Each packer, in accordance with the preferred form of the invention, includes a shell or case 40 open at its forward side to receive snow and open at its bottom end to discharge snow.

A snow handling blade 41 operates in the casing 40 and is in the nature of a helical blade or screw-shaped blade projecting from a vertically disposed hub 42 rotated from a shaft 43. The helical blade 41 extends throughout the vertical length of the casing 40 so that any and all snow entering the casing is engaged by the blade. The blade is operated in a direction so that snow engaged by it is moved or advanced downwardly to and out of the bottom end of the casing 40.

In accordance with my invention the lower end portion of the snow handling blade 41 is turned or flattened at 44 to extend in a horizontal plane so that it has a troweling action on the snow discharged from the casing 40.

In operation the snow is advanced or driven downwardly by the rotation of the blade within the casing 40 and is effectively pressed and troweled by the wiping action of the horizontal part 44 of the blade. In practice the casing 40 of each packer E may be formed of sheet metal so that it is as light and compact as possible and it is curved to conform to the plan configuration of the blade except, of course, at its forward part where it is open to receive the snow.

Where several packers E are employed, as shown in the drawings, they are arranged in close side by side relationship and enough packers are provided so that they extend completely across the path to be traversed by the vehicle. In the case illustrated four packers are shown and they are arranged and proportioned so that they will engage and pack the snow so that the parts of the vehicle following behind the packers have a clean, clear course.

The means F provide individual supports for the packers E allowing them to be moved or adjusted vertically to operate in the most advantageous vertical positions. In the particular construction illustrated guideways 50 are provided on the front of the plate 14 provided at the front of the frame A and slides 51 are provided on the rear portions of the cases 40 of the means E to operate in the guides 50. It will be understood that, in practice, any suitable guide construction may be employed in this part of the machine, it being merely necessary to support the casings 40 from the plate 14 so that they can be adjusted vertically through the desired distance.

The means G provided for adjusting the packers E preferably includes individual adjusting mechanisms so that each individual packer can be arranged at any desired vertical position independently of the other packers. In the case illustrated I have shown a simple and conventional form of adjusting mechanism involving a rack 55 on each slide 51. Each rack 55 is engaged by a pinion 56 carried on a shaft 57. Each pinion 56 is adapted to be driven or rotated by a rack 58 operated from a hand lever 59 through a connecting link 60. Through this arrangement each packer E has an individual operating lever 59 and can be moved to any desired vertical position, as will be apparent from Fig. 2 of the drawings.

The prime mover or motor H is provided in the vehicle as a source of power to operate the pump 30, the wheel support B and the packers E. In the case illustrated I have shown a conventional internal combustion engine 65 with the various parts which are commonly accessory thereto. It will be understood, of course, that in practice an engine of suitable size is employed and that it is located in the vehicle in the most advantageous manner from the standpoint of weight distribution, as well as for power distribution. In the case illustrated, and for example only, I have shown the engine mounted on the rear portion of the frame and I have shown it provided with a master control clutch 66 to be operated by a lever 67 so that the drive from the engine to the means I and J can be completely disconnected, if desired.

The drive means I for the wheel support may be any suitable drive connection whereby the wheel support is operated from the engine to cause the vehicle to advance in the desired manner. The drive may involve means for controlling the wheels of the two sides of the vehicle so that the wheel support operates as the means for controlling the direction in which the vehicle is guided.

In the drawings I have shown a drive I which involves a conventional power transmission 70 such as the change speed transmission commonly found in motor vehicles. The control lever 71 for the transmission extends to a point where it can be conveniently operated by the operator of the vehicle. In the particular case illustrated the engine 65 is located well above the transmission 70 and, therefore, I have shown a chain drive 72 between these elements. The drive from the transmission 70 to the wheels of the vehicle may involve a universal joint 75 and a suitable gear mechanism within a housing 76 carried on the rear axle 17.

To facilitate control or guiding of the vehicle I may provide a split rear axle 17, that is, one in which the axle has two sections, one driving the left wheel and one driving the right wheel, and I may provide a clutch control 77 in connection with each axle section. The clutches 77 may be under control of suitable operating levers 78 convenient to the operator of the vehicle.

The drive J for the packers E may be any suitable mechanism whereby power can be taken from the engine 65 and used to drive the blades of the packers. In the case illustrated the power shaft 80 from the engine 65 is shown extending to the forward part of the vehicle where it drives a pinion 81 through a clutch 82 under control of a lever 83. The pinion 81 is a bevel pinion which meshes with and drives a bevel gear 82ᵃ on a vertical drive shaft 84. The drive shaft 84 carries drive pulleys 86 which operate belts 87 running over pulleys 88 on spindles 89. In the particular arrangement illustrated, one pulley 86 and its belt drives the outermost spindle at one side of the machine while the other pulley 86 and its belt drives the outermost spindle at the other side of the machine. The inner spindles, that is, the spindles of the innermost packers, are driven from the spindles of the outer packers through belts 90 operating over pulleys 91 on the spindles, as clearly shown in Fig. 2. The construction described provides a simple, compact and effective arrangement whereby all of the packers are operated through a single bevel gear drive 80—81 and are under control of the single clutch 82.

The bevel gear drive established by the pinion 81 and gear 82 may be housed in a suitable casing 91ᵃ and the belt drive involving the several pulleys and belts hereinabove described may be housed within a suitable casing 92. The several spindles 89 of the drive hereinabove referred to are provided to operate the shafts 43 of the packers. There is a spindle 89 in vertical alignment with each shaft 43. The shafts slidably extend into the spindles and are splined or otherwise fitted therein so that a driving connection is established between the spindles and the shafts. Through the spline connections drive connections are maintained between the spindles and the shafts, regardless of the vertical positioning of the packers. It will be understood, of course, that in practice various mechanical arrangements may be provided to effect this action and the broader principles of the invention are not limited to the particular mechanism I have described.

From the foregoing description it will be apparent that I have provided a vehicle that will operate to advance into a bank or body of snow and which will operate to receive the snow in the packers, thrust it downwardly and pack it to establish a hard bed or body over which the skids and wheel supports will operate. The packers can be adjusted to various positions to best handle the snow encountered and the skids can be adjusted relative to the wheel support to most advantageously bear part of the weight of the machine. By properly controlling the speed of advance the machine will operate to effectively handle the snow encountered and will operate through practically any body of snow ordinarily encountered. It will be observed that the machine which I have provided not only provides a bed or track over which it may be operated, but that the bed thus established can be used by succeeding vehicles, in that ordinary vehicles will operate over snow that has been packed by my machine.

Having described only a typical preferred form and application of my invention, I do not wish to be limited or restricted to the specific details herein set forth, but wish to reserve to myself any variations or modifications that may appear to those skilled in the art or fall within the scope of the following claims:

Having described my invention, I claim:

1. A vehicle of the character described including, a frame, means for supporting and propelling the frame and operable on a firm support to hold the frame in a stable position, and a snow packer carried by the frame and confined to the forward end of the vehicle forward of said means and including a snow handling element to be advanced into snow at the front of the vehicle and operable to move substantially the entire body of snow that is engaged downwardly and to pack it firm so the vehicle can pass over it.

2. A vehicle of the character described including, a frame, means for supporting and propelling the frame, and a snow packer carried by the frame and including a rotating helical snow handling element to be advanced into snow and having a substantially vertical axis of rotation and being pitched and rotated to move the snow downwardly and pack it firm so the vehicle can pass over it.

3. A vehicle of the character described including, a frame, means for supporting and propelling the frame, and a snow packer carried by the frame and including a rotating helical snow handling element to be advanced into snow and having a substantially vertical axis of rotation and being pitched and rotated to move the snow downwardly and pack it so the vehicle can pass over it, and a casing around said element open at the front to receive snow and at the bottom to discharge snow.

4. A vehicle of the character described including, a frame, means for supporting and propelling the frame and operable on a firm support to hold the frame in a stable position, and a snow packer carried by the frame and including rotating helical snow handling element to be advanced into snow and having a substantially vertical axis of rotation and being pitched and rotated to move the snow downwardly and pack it firm in the path of said means so the vehicle can pass over it.

5. A vehicle of the character described including, a frame, means for supporting and propelling the frame, and a snow packer carried by the frame and including a snow handling element rotating about a substantially vertical axis to be advanced into snow and operable to move the snow downwardly and pack it so the vehicle can pass over it, the lower end of the element having a horizontally disposed part to operate over the snow packed by the element.

6. A vehicle of the character described including, a frame, means for supporting the frame in a stable position on a firm support and for propelling the frame over the support, and a plurality of individually adjustable snow packers carried by the frame forward of said means and each including a power driven rotating snow handling element to be advanced into snow and operable to move the snow downwardly and pack it to form a firm support so the vehicle can pass over it.

7. A vehicle of the character described including, a frame, means for supporting and propelling the frame, a plurality of individually adjustable vertically disposed snow packing screws carried by the frame and each being pitched and rotated to move the snow downwardly and pack it so the vehicle can pass over it, and a single drive means for operating the several screws.

8. A vehicle of the character described including, a frame, means for supporting and propelling the frame including a plurality of supporting wheels and skids supplementing the wheels, and a power driven snow packer carried by the frame at its forward end ahead of said means and including a rotating snow handling element to be advanced into snow and operable to move substantially all of the snow engaged by it downwardly and to pack it so the vehicle can pass over it.

9. A vehicle of the character described including, a frame, means for supporting and propelling the frame including front and rear wheels, skids supplementing the wheels and endless belts running over the wheels, and a power driven snow packer carried by the frame forward of said means and including a vertically disposed snow handling screw to be advanced sidewise into snow and operable to move the snow downwardly and pack it below the lower end of the screw so the vehicle can pass over it.

10. A vehicle of the character described including, a frame, means for supporting and propelling the frame, including a plurality of wheels, means for driving the wheels, and skids supplementing the wheels, and a snow packer carried by the frame forward of the wheels and including a snow rotating snow handling screw having a vertical axis of rotation and adapted to be advanced sidewise into snow and operable to move the snow downwardly and pack it so the vehicle can pass over it.

11. A vehicle of the character described including, a frame, means for supporting and propelling the frame, including supporting wheels, means for driving the wheels, and skids beside the wheels supplementing the wheels, and means for adjusting the skids vertically relative to the wheel support, and a snow packer carried by the frame and including a rotating screw having a vertical axis of rotation and adapted to be advanced sidewise into snow and operable to move the snow as a body downwardly and pack it so the vehicle can pass over it.

12. A vehicle of the character described including, a frame, means for supporting and propelling the frame, including supporting wheels, means for driving the wheels, and skids supplementing the wheels, and means for adjusting the skids vertically relative to the wheels including independently operable adjusting means at each end of each skid, and a vertically disposed rotating screw snow packer carried by the frame forward of the wheels and skids to be advanced into snow and operable to move the snow downwardly and pack it so the vehicle can pass over it.

13. A vehicle of the character described including, a frame, means for supporting and propelling the frame, including front and rear wheels and an endless belt operating over the wheels, means for driving the wheels, and skids supplementing the wheels, and means for adjusting the skids vertically relative to the wheels including independently operable adjusting means at each end of each skid, and a snow packer carried by the frame forward of the wheels and skids and including a rotating snow handling screw to be advanced into snow and a case around the screw open to receive and discharge snow, the screw being operable to move the snow entering the case downwardly and pack it below the case so the vehicle can pass over it.

14. A vehicle of the character described including, a frame, means for supporting and propelling the frame, including front and rear wheels and an endless belt operating over the wheels, means for driving the wheels, and skids supplementing the wheels, and means for adjusting the skids vertically relative to the wheels including independently operable adjusting means at each end of each skid, and a snow packer carried by the frame and including a plurality of individually vertically adjustable snow handling elements to be advanced into snow and operable to move the snow downwardly and pack it so the vehicle can pass over it, each element including a vertically disposed rotating screw shaped blade operating in a casing open at the front and bottom.

15. A vehicle of the character described including, a frame, means for supporting and propelling the frame operable on a firm support to hold the frame in a stable position, and a snow packer at the forward end of the frame including a plurality of independently vertically adjustable units each including a helical blade rotating on a vertical axis to be fed sidewise into snow and operable to pack the snow down into a firm support.

16. A vehicle of the character described including, a frame, means for supporting and propelling the frame operable on a firm support to hold the frame in a stable position, and a snow packer at the forward end of the frame including a plurality of independently vertically adjustable units each including a helical blade rotating on a vertical axis to be fed sidewise into snow and operable to pack the snow down into a firm support, the units being in side by side relation to form a packer extending completely across the path of said means.

17. A vehicle of the character described including, a frame, means for supporting and propelling the frame, and a snow packer at the forward end of the frame including a plurality of units in side by side relation and each including a rotating helical blade with its axis vertically disposed, and means for individually adjusting the units vertically.

18. A vehicle of the character described including, a frame, means for supporting and propelling the frame, and a snow packer at the forward end of the frame including a plurality of units in side by side relation and each including a rotating helical blade with its axis vertically disposed, and a casing around the blade open at its side to receive snow and at its end to discharge snow, and means for individually adjusting the units vertically.

SAMUEL C. CARTER.